United States Patent [19]
Koeppel

[11] Patent Number: 5,259,515
[45] Date of Patent: Nov. 9, 1993

[54] ROTATABLE DISPLAY TOWER FOR AUDIO CASSETTE TAPES AND THE LIKE

[75] Inventor: Lloyd Koeppel, North Freedom, Wis.

[73] Assignee: Gressco, Ltd., Madison, Wis.

[21] Appl. No.: 806,714

[22] Filed: Dec. 12, 1991

[51] Int. Cl.$^5$ ............................................. A47F 7/00
[52] U.S. Cl. ...................................... 211/40; 211/41; 211/163
[58] Field of Search ............ 211/40, 41, 163, 95; 108/60, 94

[56] References Cited

U.S. PATENT DOCUMENTS

| | | | |
|---|---|---|---|
| 1,381,525 | 6/1921 | Wagoner et al. | 211/40 |
| 2,950,155 | 8/1960 | Schick | 211/163 X |
| 3,181,706 | 5/1965 | Mandel | 211/163 |
| 3,337,059 | 8/1967 | Le Hoy | 211/40 X |
| 3,568,854 | 3/1971 | Welch | 211/163 |
| 3,844,230 | 10/1974 | Hudson et al. | 211/42 X |
| 3,915,306 | 10/1975 | Desisto et al. | 211/40 X |
| 4,684,030 | 8/1987 | Gurzynski | 211/40 X |
| 4,700,846 | 10/1987 | Schroder | 211/41 |
| 4,913,296 | 4/1990 | Cournoyer et al. | 211/41 |

FOREIGN PATENT DOCUMENTS 1584157 2/1981 United Kingdom ............ 211/40

*Primary Examiner*—Alvin C. Chin-Shu
*Attorney, Agent, or Firm*—Henry R. Lerner

[57] ABSTRACT

A rotatable display tower, preferably for use as a merchandising rack for the original sale of packaged products, preferably audio cassette tapes. The tower provides, in a relative minimum of space, a large number of audio cassette tapes to be viewed "head or face on" and, their spines, too. The display tower securely holds the packages, in a tilted-back manner, yet allows the consumer to easily remove the same for purchase.

7 Claims, 4 Drawing Sheets

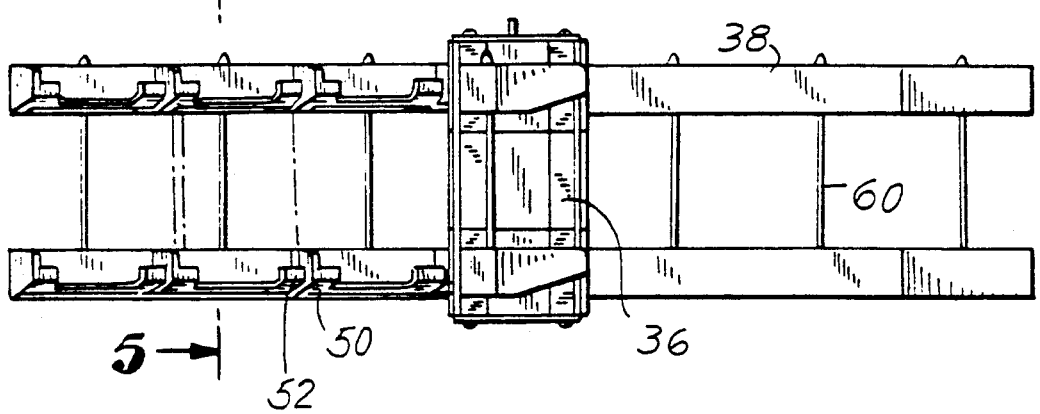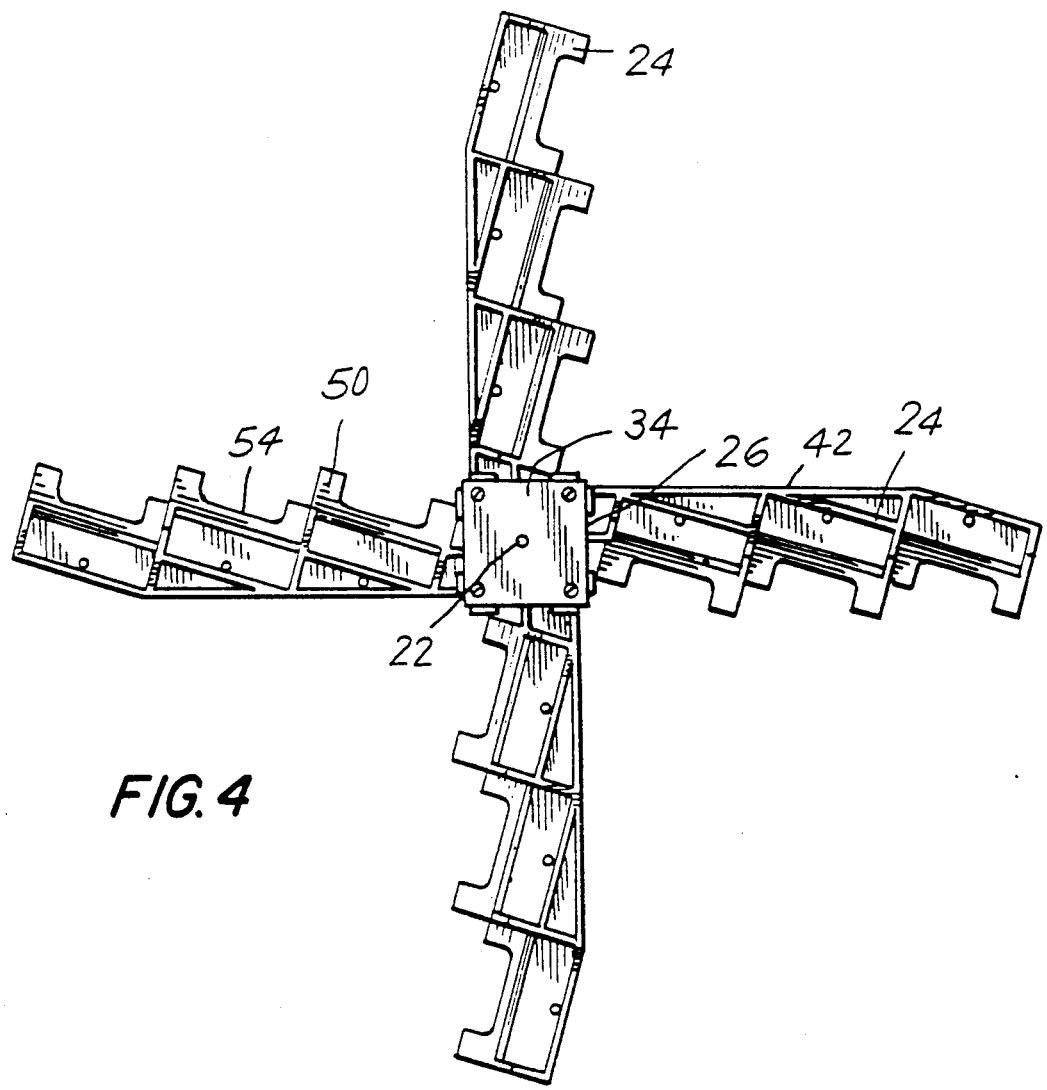

ROTATABLE DISPLAY TOWER FOR AUDIO CASSETTE TAPES AND THE LIKE

BACKGROUND OF THE INVENTION

The present invention relates to a rotatable display tower for use in connection with merchandising or mere display for browsing of paperback books, compact audio discs, audio and video cassette tapes and LP records, etc. In a relative minimum of space, the present invention provides for the attractive display of a large quantity of articles sought to be merchandised, displayed and/or sold. The rotatable display tower is preferably held on a stationery support base. The consumer stands in a single position and rotates the display tower about its central vertical axis in order to view all of the available articles of merchandise contained on the rack. A wide variety or selection is thus viewable in a small floor area with maximum convenience to the consumer.

The preferred embodiment of the present invention contemplates that the display tower is supported by one or more I-frames, as disclosed in my co-pending patent application filed even date herewith and identified as Ser. No. 07/806,713, Pat. No. 5,226,548 issued Jul. 7, 1993. It is an object of the present invention to display a plurality of articles for rent, borrowing or sale, preferably. audio or video cassette tapes or compact discs, in such a manner that a substantial number of the face and spine portions of the packaging for the audio or video cassette tapes are simultaneously visible to the potential consumer. The front or face portion of the packaging for audio and video cassette tapes are frequently provided with visually attractive artwork, and in addition, the tile of the "work" and the group or individual singer performing thereon. Thus, display of the front face is highly desirable for effective merchandising of the product. Display of the spines, too, is highly desirable for effective merchandising. The present invention displays the merchandise in a highly attractive manner, using a minimum of floor space, in a relatively inexpensive manner and with convenience to the browsing consumer.

DESCRIPTION OF THE PRIOR ART

U.S. Pat. No. 3,844,230 to Hudson et al. shows a display rack or tower for paperback books. According to the specification of that patent, a paperback book displayer provides, in a relatively simple and compact form, a large capacity for displaying various articles of merchandise. The displayer shown therein basically includes one or more towers which are freely rotatable about a common vertical central axis with each tower including a multiple series of vertically spaced shelves or platforms arranged in tiers of any desired number of book supporting shelves. According to the description of the device shown in the Hudson et al. patent, the spines and many of the front covers of the books displayed on the shelves are simultaneously visible. This is, of course, an extremely important aspect of successful merchandising of these products.

So, too, the present invention contemplates providing a rotatable display tower for audio and/or video cassette tapes, compact discs, LP records, paperback books, etc. (hereinafter often collectively referred to for convenience as "displayed merchandise"). The consumer can rotate the tower about its vertical central axis. The spines of the displayed merchandise as well as the front faces for the displayed merchandise are simultaneously viewable. The displayed merchandise are securely held yet easily removable for purchase. Visibility is highly desirable since sales of the merchandise are, to a large degree, directly dependent on the consumer's appreciation of the information (art work, title or work, authors/artists, etc.) of the article sought to be merchandised; the information being conveyed on the front face and on the spine of the displayed merchandise.

The preferred embodiment of the present invention contemplates the display of packaged audio cassette tapes and, accordingly, the present invention will be described with respect thereto, although it should be appreciated that the displayed merchandise which can be held by the rotatable tower of the present invention can also be video cassette tapes, compact discs, LP records, paperback books, hard cover books, and other similar merchandise.

SUMMARY OF THE INVENTION

The present invention relates to a rotatable display tower for audio or video cassettes, compact discs, LP records, paperbacks, hard cover books, etc. At least with respect to audio compact discs and audio and video cassette tapes, these are generally sold in protective and visually attracting boxes or packaging. The present invention provides a display tower for supporting the packaged merchandise.

The present invention, a display tower, is rotatable about a central vertical axis to allow the potential consumer to stand in one location and, yet, by rotating the display tower, a large quantity of available merchandise can be viewed. According to the invention, the vertically spaced shelves or tiers of the display tower securely hold the displayed merchandise in a slant back or tilt-back position. This is believed to provide a visually superior orientation for browsing and/or generating sales by potential purchasers. In addition, the present invention contemplates that the individual articles of merchandise are fully viewable face-on. The spines of the merchandise are also viewable in that each arm staggers adjacent cassette tapes. The displayed merchandise is securely held in the tower's many pockets so that, during rotation, all of the fronts or faces of the packaged goods and their spines can be viewed. The present invention provides a rotatable display tower comprising a plurality of stacked shelves, each of which carries a plurality of displayed merchandise. The shelves comprise radially extending arms which support the packaged cassette tapes in individual "pockets".

It is an object of the present invention to support the displayed merchandise, securely, between vertically opposed pairs of radially extending arms of the shelves and, yet, when a consumer desires to purchase an article of merchandise, the item can be easily removed from the display tower by a simple manipulation of the merchandise with respect to the display tower.

It is a further object of the present invention to construct a display tower comprising a plurality of vertically spaced shelves or tiers which are substantially identical to one another. The shelves comprise radially extending arms; each shelf or radially extending set of arms being substantially identical to the shelves or radially extending arms located above and/or below it. Thus, a merchandiser can assemble a rotatable display tower in a wide range of heights using the modular-like shelves, stacking the tiers one upon another. This allows the displayer to merchandise a wide range of articles of merchandise.

These, and other objects of the present invention, are accomplished and will be more easily understood with reference to the accompanying set of drawings, which are described herein.

BRIEF DESCRIPTION OF THE DRAWINGS

FIG. 3 is a side elevational view of a portion of the display tower shown in FIG. 1, this figure showing a pair of vertically spaced shelves or sets of arms with a packaged cassette tape shown in phantom detail;

FIG. 4 is a bottom plan view of the display tower shown in FIG. 1;

DETAILED DESCRIPTION OF THE INVENTION AND THE PREFERRED EMBODIMENT

Figure 1:
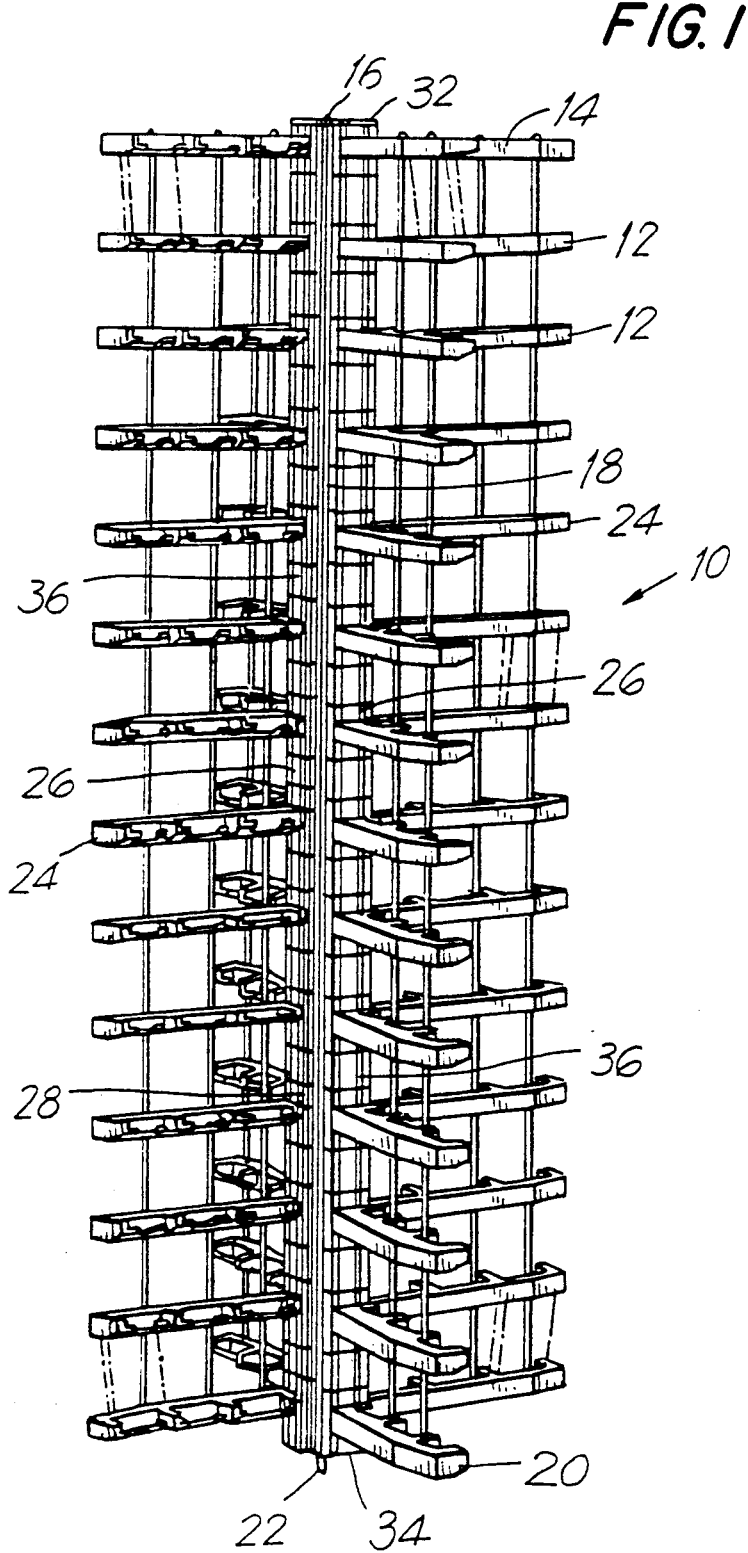
FIG. 1 is an elevational perspective view of a tower embodying the preferred embodiment of the present invention and showing several cassette tapes, in phantom detail, supported therein.

As best seen in FIG. 1, a display tower generally referred to as 10 comprises a plurality of shelves or tiers 12, which are vertically spaced or stacked one upon another. In the illustrated embodiment, fourteen tiers are provided to form a single tower about 5' in overall height. The display tower provides thirteen levels of cassette tapes. According to this embodiment, about 156 cassette tapes are supported in the display tower. The display tower 10 can be turned about central rotative axis 18 for allowing a potential consumer to turn the display tower. A top shelf 14 has the exposed end 16, of the central rotative axis 18 passing therethrough. The bottom shelf 20 similarly has an exposed end 22 of the central rotative axis 18 projecting downwardly therethrough. Exposed end 22, along with exposed end 16 of central rotative axis 18, provide the mechanical interconnection of the display tower 10 with a base or support structure. When the tower 10 is rotatively held in a base or support structure, the entire tower 10 can rotate about the central rotative axis 18.

In the preferred embodiment of the present invention, two or more display towers 10 are rotatively supported in at least one I-shaped frame. The I-frames provide pairs of opposed bearing structures for holding therebetween exposed end 16 and lowermost exposed end 22. With the central rotative axis 18 aligned with the bearing structures of the I-frame, the display tower 10 is adapted for rotation by a consumer. In this connection, the teachings, drawings and description of my invention for an I-frame tower support is incorporated herein by reference. That application is co-pending and identified as U.S. patent application Ser. No. 07/806,713, U.S. Pat. No. 5,226,548, issued Jul. 13, 1993.

The tower of the present invention, however, can be supported on any support or base so long as the tower is allowed to rotate about its central axis 18.

Each tier or shelf 12, according to the preferred embodiment, is provided with four outwardly, radially extending arms 24. When four arms are provided, they extend perpendicularly to one another, extending away from the central rotative axis 18. The outwardly, radially extending arms 24 are secured to or integrally molded with planar surfaces 26, four of which, together, form a box-like structure 28. Structure 28 is fixedly secured to the central rotative axis 18 so that when the axis 18 rotates, the arms 24 rotate. A top plate 32 and bottom plate 34 physically "close-off" the openings of the box-like structures 28, when vertically stacked. Top plate 32 and bottom plate 34 prevent dust or other particles from becoming entrapped within the interior of the box-like structures 28 formed, as mentioned, by the planar surfaces 26. It will be appreciated that the exposed end 16 of axis 18 extends through a centrally located aperture in top plate 32, while the lowermost exposed end 22 extends though an aligned central aperture passing through bottom plate 34.

Planar spacers 36, four of which together form spacing boxes, are vertically interposed between stacked box-like structures 28 and serve to space one shelf or tier 12 from its immediately above or below shelf or tier 12. As will be appreciated by a review of the drawings, each associated pair of immediately adjacent shelves or tiers 12 defines a plurality of merchandise holding pockets. The shelves secure and display an article of merchandise, preferably, packaged audio cassette tapes (ACTs, for short). Each shelf or tier provides a bottom support for the lowermost edge of the ACT and, immediately beneath, the very same shelf or tier correspondingly provides a top support for an ACT held immediately below it; that ACT being supported from below by another shelf. Of course, it should be easily understood that top shelf 14 only provides top support for an ACT held beneath it and does not provide bottom support for any ACT held above it. Similarly, bottom shelf 20 only provides bottom support for an ACT supported above it and does not provide top support for an ACT held beneath it.

Figure 5:
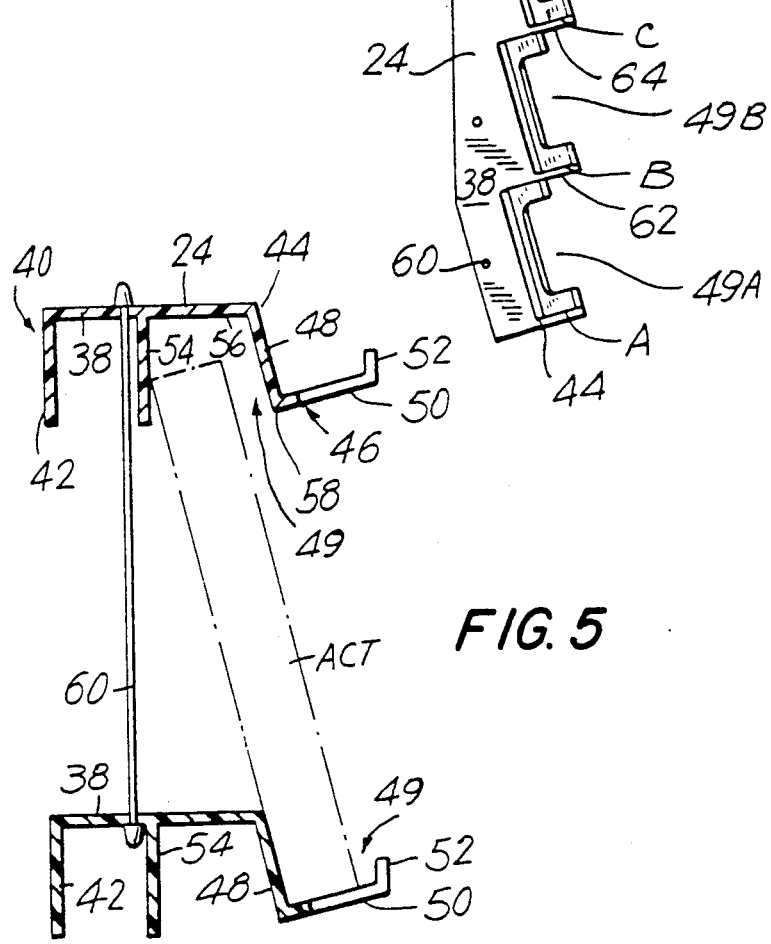
FIG. 5 is a cross-sectional view taken along lines 5—5 of FIG. 3 and shows the packaged cassette tape (hereinafter referred to, more simply, as the cassette tapes, themselves) in phantom detail supported within the pocket portion of the vertically spaced pair of shelves shown in FIG. 3.

As best seen in FIG. 5, in cross-section, an arm 24 of a shelf or tier 12, preferably integrally molded from plastic, comprises a planar horizontal surface 38. At one end of planar horizontal surface 38, the back end 40, a downwardly directed leg 42 is provided. Extending from the front end 44 of planar horizontal surface 38 is a holding leg 46. Holding leg 46 has a downward and forward slanted leg portion 48, a forward and upwardly slanted bottom support surface 50 extending from leg portion 48, and a holding lip 52. A top support surface 54 extends down from planar horizontal surface 38 at about the mid-point thereof. As can best be seen in FIG. 5, the bottom support surface 50, leg portion 48, and top support surface 52 provide support for the bottom, rear and top of the ACT.

Figure 2:
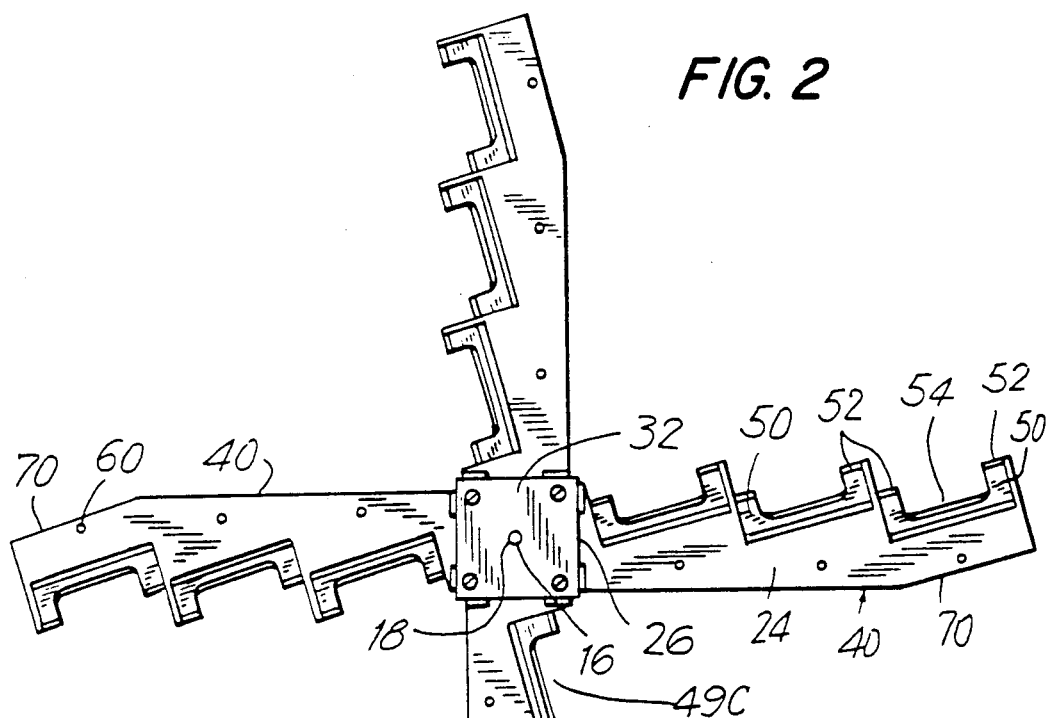
FIG. 2 is a top plan view of the display tower of the present invention shown in FIG. 1.

The upwardly extending lip 52 is integrally formed with the outermost end of bottom support surface 50. As best seen in FIGS. 1, 2 and 3, the upwardly extending holding lip 52 does not, necessarily, extend across the entire width of the pockets 49 of the shelves 12 but, rather, is provided with a recess or convenient hand hold 54, separating the segments of the holding lip 52.

Figure 6:
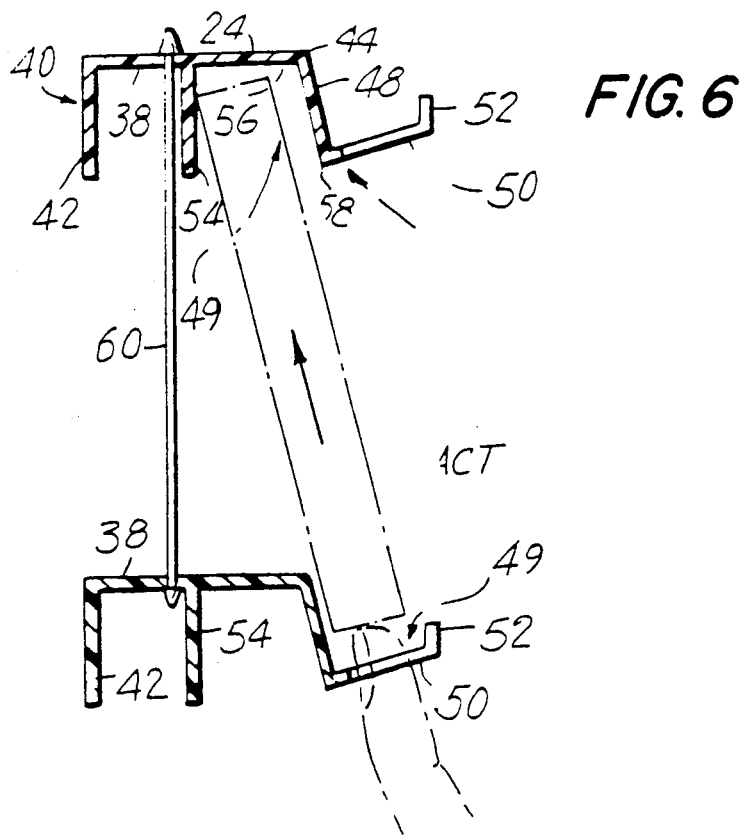
FIGS. 6 and 7 are views similar to FIG. 5 but showing in phantom the manipulation of the audio cassette tapes for removal thereof from the display tower.
Figure 7:
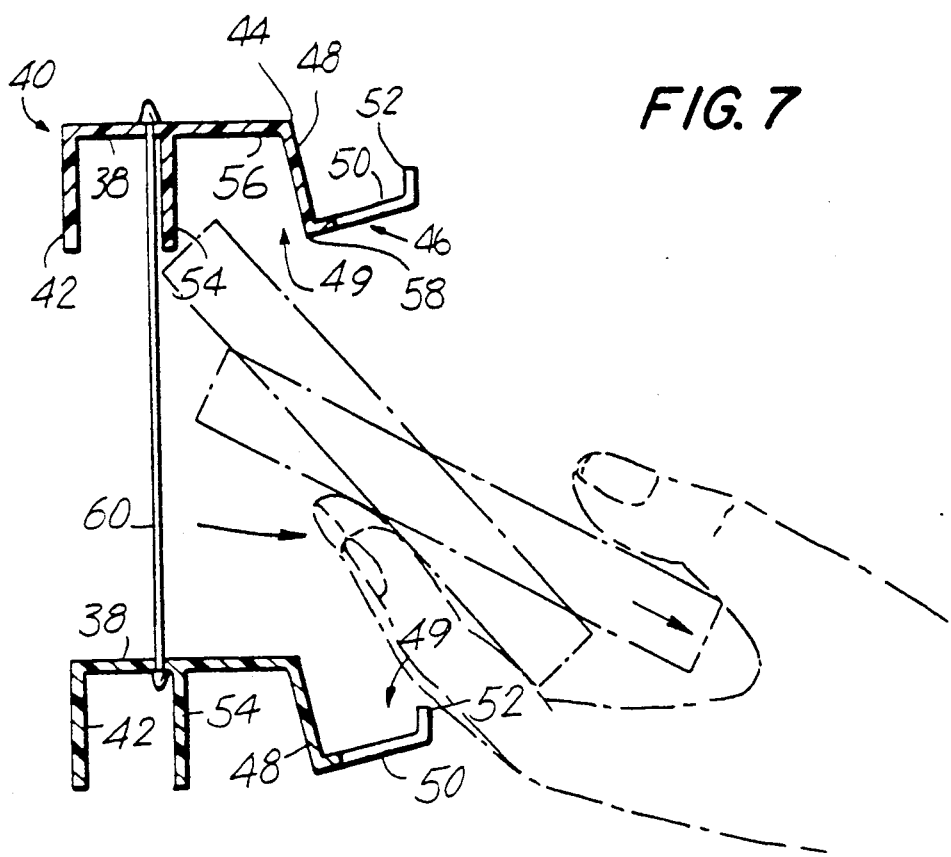

As can best be appreciated by a review of the bottom portion of FIG. 5, the holding lip 52 and the rear surface of leg portion 48 block the ACT from accidentally or inadvertently falling out of the pockets 49, at least until the ACT is first manually lifted upwardly a sufficient distance until the bottom of the ACT clears leg holding lip 52. The manual movements required for the intentional removal of the ACT are shown in FIGS. 6 and 7 and require first the lifting of the ACT until its bottom edge clears the holding lip 52 and then the bottom of the ACT can be swung out. Leg portion 48 extends downwardly from planar surface 38 and holding lip 46 extends upwardly a sufficient distance such that the ACT will not accidentally or inadvertently fall off of the display tower. The distance between the under needle surface 56 of planar surface 38 and the top surface of support surface 50, is sufficient such that an ACT can be inserted into the pockets 49 formed thereby, with the ACT's bottom held on the support surface 50 and the tops of the ACT extending vertically beyond the lowermost portion of top support surface 54 and point 58, the intersection of leg portion 48 and support surface 50. The spacing between shelves or tiers 12 is such that the ACT, when desirably removed from the display tower 10, must be first manually lifted upwardly such that the top of the ACT goes into the space defined below top support surface 54 and leg portion 48 and, then, the lowermost end of the ACT can clear holding lip 52. The distance, then, between the top of an ACT and horizontal surface 38 must be greater than the upward extension or length of holding lip 52. This dimensioning facilitates easy placement and removal of ACTs on the shelves, while securely holding the ACTs until intentionally removed. The insertion of new or additional ACT's into the display tower, for merchandising purposes, is the exact reverse of the described manual steps.

A plurality of thin metal rods 60 pass through the horizontal surfaces 38. The rods 60 are spaced and, according to the preferred embodiment, a rod 60 is provided for supporting the spacing between the tiers. One rod 60 is normally located behind and in the middle of each pocket 49. The backwardly tilted ACTs lean against the top support surface 54 (see FIG. 5). The use of the rods 60, preferably metal, allows for a more "open" visual display rack having more light transmission through the tower.

As can best be seen in FIGS. 1-4, in the preferred embodiment, the outwardly radially extending arms 24 extend a distance to accommodate three laterally spaced individual support pockets 49. It should be appreciated that more than three such individual support pockets 49, for each arm 24, can be provided. If additional individual support pockets ar desired for each pair of vertically opposed, radially outwardly extending arms 24, the arms can be lengthened, outwardly from the central rotative axis 18 and pockets comprising end walls 62 and 64 having top support surfaces 54, bottom support surface 50, holding lips 52 are molded, identical to those previously described.

As can best be appreciated by a review of the drawings and the description, the person seeking to display ACTs has the flexibility, with the present described display tower, to design and assemble shelves, with the planar spacers 36, to construct a display tower according to the desired height of the tower, consistent with the variety of merchandise to be displayed.

Back end 40 of the holding pockets 49 are coplanar for the inward of the holding pockets. This can be best appreciated by a review of FIG. 2. However, to facilitate turning of the tower, the back end 40 of the outermost pocket 49 is angled in the respect to the other, more inwardly radially located pockets. Thus, a turning surface 70 is provided.

As can best be appreciated by a review of FIGS. 1, 2 and 4, each holding pocket for ACTS is radially staggered with respect to adjacent holding pockets. Thus, with respect to holding pockets 49A, 49B and 49C (See FIG. 2), the spines of cassette tapes held therein are all simultaneously visible since the spines would be outwardly directed and staggered at location A, B and C, respectively.

Referring now to FIGS. 6 and 7, there is shown the nature of the manipulation which enables an individual audio cassette to be removed from the tower.

Referring first to FIG. 5, it will be noted that the audio cassette when mounted on the tower, has its lower edge supported by bottom surface 50, with its upper end resting against support surface 54 and with the cassette being kept from falling out by side leg portion 48. As best shown in FIG. 6, when it is desired to remove a cassette from the display rack, the audio cassette is lifted from the bottom by an index finger or middle finger, as to clear the vertical legs 52. In this connection it will be noted that the finger can lift the bottom of the cassette since the central portion of the cassette is exposed by recess 54 as best seen in FIG. 2. Once the audio cassette is liftime until it clears the vertical edge 52 shown in FIGS. 6 and 7, the bottom of the audio cassette is swung out and away from the arm. As shown in FIG. 7, there is a natural tendency for the hand and fingers to cup slightly as the cassette is being withdrawn, such cupping of the hand creating a ramp which causes the cassette to slide toward and drop into the palm of the hand. The thumb easily traps the audio cassette between it and the extended fingers on the hand.

In order to insert the audio cassette into the display rack, the steps described above are performed in reverse.

Obviously, numerous variations of the above described structure can occur to those of skill in the art. The invention is not to be limited to that described. The claims which follow, as the same are interpreted by the Courts, is the true scope of this invention.

I claim as follows:

1. A rotatable merchandise display tower comprising at least two vertically spaced hub-like shelves, each of said shelves, comprising two or more arms radially extending from a central axis of rotation, all of said axes of rotation being vertically aligned so that said shelves rotate about a common axis of rotation, said arms having both a top and bottom merchandise supporting surfaces for providing support to merchandise held below and above said shelves, respectively, said arms defining at least two horizontal, spaced, extending outwardly from said axis of rotation, radially staggered merchandise holding pockets, each of said pockets being substantially open towards the front and sides to allow said merchandise held in said pockets to be viewed both face-on and spine-on by merely turning said shelves, each of said pockets for said merchandise being defined by said bottom supporting surface of a first of said arms and said top supporting surface of an arm immediately above said first of said arms.

2. A rotatable merchandise display tower as claimed in claim 1 wherein said bottom supporting surface is provided with a holding lip for selectively blocking unintentioned removal of said merchandise from said pocket.

3. A rotatable merchandise display tower as claimed in claim 1 wherein the distance between said bottom supporting surface of said first of said arms and said top supporting surface of an arm immediately above said first of said arms is greater than the height of the merchandise sought to be displayed on said tower.

4. A rotatable merchandise display tower as claimed in claim 1 wherein said bottom supporting surface is upwardly slanted for securing said merchandise in said pocket.

5. A rotatable merchandise display tower as claimed in claim 1 wherein the distance between said top supporting surface of a first of said arms and said holding lip of an arm immediately below said first of said arms is predetermined as more than the height of the merchandise sought to be displayed on said tower.

6. A rotatable merchandise display tower as claimed in claim 1 wherein adjacent arms are supported by a plurality of rods extending vertically between immediately adjacent arms.

7. A rotatable merchandise display tower as claimed in claim 1 wherein said bottom supporting surfaces are laterally staggered with respect to the top supporting surface of the immediately above arm.

* * * * *